(No Model.)
A. C. CONERY.
STALK CUTTER.
No. 248,577. Patented Oct. 25, 1881.
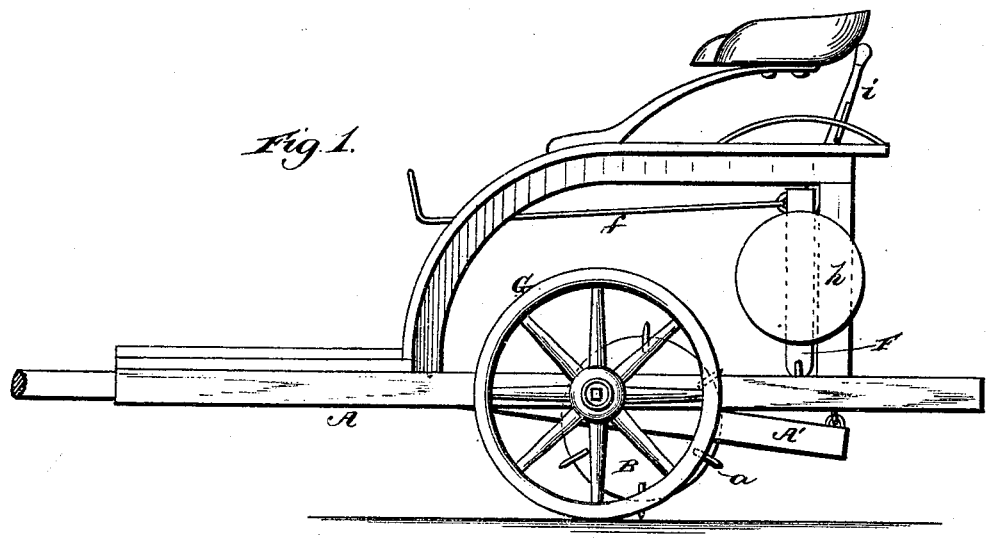
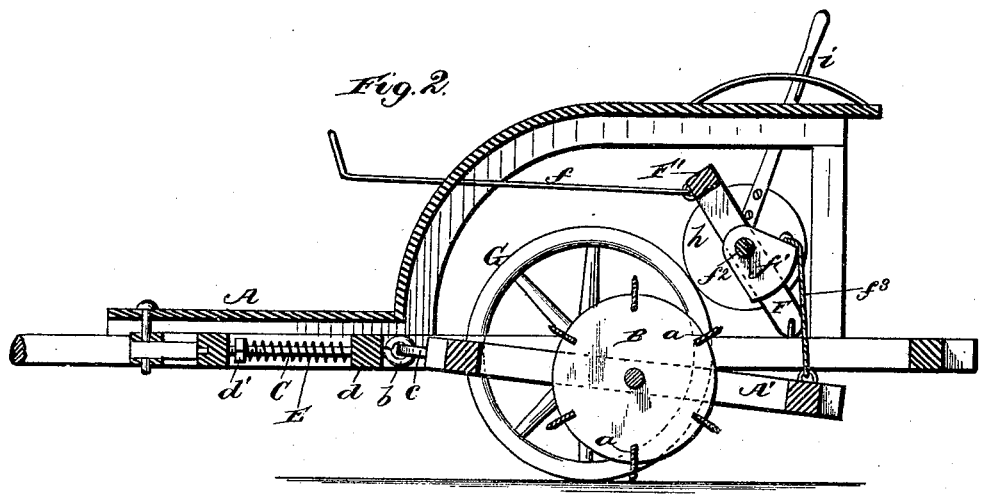
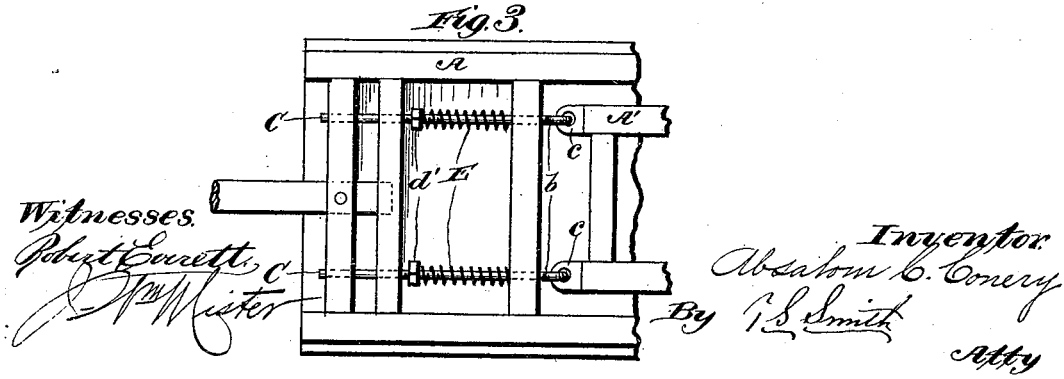
Witnesses.
Inventor.
Absalom C. Conery
By T. S. Smith
Atty

UNITED STATES PATENT OFFICE.

ABSALOM C. CONERY, OF MAQUOKETA, IOWA.

STALK-CUTTER.

SPECIFICATION forming part of Letters Patent No. 248,577, dated October 25, 1881.

Application filed August 6, 1881. (No model.)

*To all whom it may concern:*

Be it known that I, ABSALOM C. CONERY, a citizen of the United States, residing at Maquoketa, in the county of Jackson and State of Iowa, have invented certain new and useful Improvements in Stalk-Cutters; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification, and in which—

Figure 1 is a side elevation of my improved stalk-cutter. Fig. 2 is a longitudinal vertical section thereof; and Fig. 3 is a partial inverted plan with the portion of the machine back of the spring broken away.

This invention has relation to improvements in stalk-cutters, particularly for cutting cornstalks, having for its object to effect the automatic elevation of the cutters by a backward movement of the machine; and the nature of my invention consists in combining with the stalk-cutter-cylinder frame certain elevating mechanism, substantially as hereinafter more fully set forth and claimed.

In carrying out my invention I employ, in connection with the main frame A and the inner frame, A', carrying the cutter-cylinder B, having the transverse cutters or blades $a$, the parallel rods C C, which pass through apertures in the cross-pieces of the frame A. The inner ends of the rods C C are preferably formed with hooks or eyes $b$, to which the cutter-cylinder frame A' is connected by perforated plates, hooks, or eyes $c$, to form hinge or pivotal joints between the two frames, to enable the cutter-cylinder to operate independently of the main frame and be capable of elevation, as presently described. These rods are encircled between a cross-bar, $d$, and adjusting-nuts $d'$, screwed thereon, by coiled springs E, by which it will be noticed that the pressure of the springs is applied to the rods, so that the concussion of the chopping or cutting action of the knives of the cylinder carried or drawn by the frame A', hinged to said rods, will be received upon the latter and be taken off the main frame, to which the team is hitched, and upon which the driver stands or is seated. This latter is obvious from the fact that as the concussion is received upon the rods they move, by reason of their spring-bearings, and not the main frame having the driver's seat, and to which the team is connected. The nuts $d'$ permit, also, of taking up slack from wear of the springs, and the increasing of the resisting capacity of the springs to promote their efficiency.

F F are two short standards, pivoted or hinged upon the rear part of the main frame A, preferably under cover, and connected together by a cross-piece, F'. This forms a lever, the operating medium of which consists of a rod or lever, $f$, passing forward through the aforesaid cover, or otherwise supported within convenient reach of the driver's feet. A cam, $f'$, is arranged upon the shaft $f^2$, hung in the standards of said lever F F F', and has passing over it and attached to it a cord, chain, or wire, $f^3$, reaching down and connected to the rear end of the cutter-cylinder frame A'. At the ends of the shaft $f^2$ are friction rolls or disks $h$, which are adapted to bear upon the driving-wheels G when the lever F F' is thrown forward by operating the lever $i$, and as the machine is backed the motion received from the wheels G will cause the rolls $h$ to revolve, and with them the shaft $f^2$ and its cam $f'$, which will effect the automatic elevation of the frame A' and cutter-cylinder up out of use. The shaft $f^2$, with its cam and the cutter-frame-elevating medium $f^3$, is also capable of manipulation and being held so as to retain the cutter-cylinder in its elevated position by means of the hand-lever $i$, extending forward within easy reach of the driver, when the shaft has been turned so as to elevate the cutter-cylinder.

Having thus fully described my invention, I claim and desire to secure by Letters Patent—

1. In a stalk-cutter, the combination, with the main frame A and the cutter-cylinder frame A', of the lever F F', having the cam-shaft $f^2$, cord $f^3$, the operating mechanism $f$, and the friction rolls or disks $h$, substantially as described.

2. In a stalk-cutter, the combination, with the main frame A, its wheels G, and the cutter-cylinder frame A', pivoted or hinged to frame A, of the lever F F', its operating medium $f$, cam-shaft $f^2$, the wire, rope, or chain $f^3$, and the friction disks or rolls $h$, substantially as and for the purpose set forth.

In testimony whereof I affix my signature in presence of two witnesses.

ABSALOM C. CONERY.

Witnesses:
W. H. MANOGUE,
J. WM. MISTER.